Figure 1:
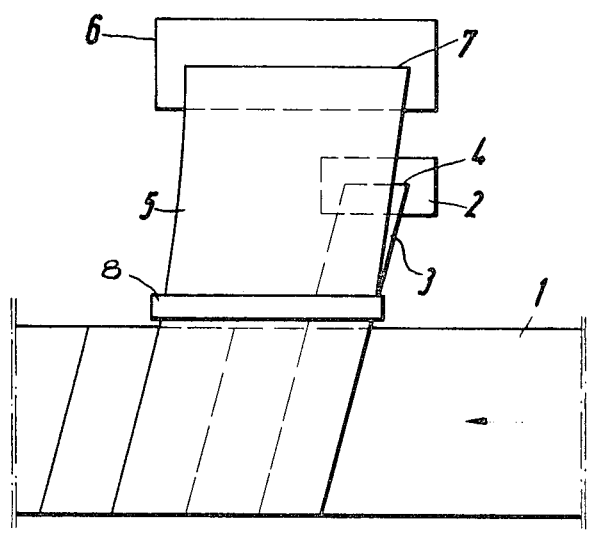

United States Patent

[11] 3,616,006

| [72] | Inventors | Helmut Landgraf |
| | | Rumeln Kreis, Moers; |
| | | Walter Quitmann, Angermund, both of |
| | | Germany |
| [21] | Appl. No. | 839,518 |
| [22] | Filed | July 7, 1969 |
| [45] | Patented | Oct. 26, 1971 |
| [73] | Assignee | Mannesmann Aktiengesellschaft |
| | | Dusseldorf, Germany |
| [32] | Priority | July 5, 1968 |
| [33] | | Germany |
| [31] | | P 17 71 764.5 |

[54] METHOD OF ENVELOPING A STEEL PIPE
3 Claims, 2 Drawing Figs.

[52] U.S. Cl............................................... 156/188,
156/195, 156/392
[51] Int. Cl........................................................ B65h 81/02
[50] Field of Search............................................ 156/187,
188, 195, 392, 185, 192

[56] References Cited
UNITED STATES PATENTS

| 2,371,224 | 3/1945 | Cumfer........................ | 156/187 |
| 2,700,631 | 1/1955 | Ferguson et al. ............. | 156/187 X |
| 2,731,070 | 1/1956 | Meissner...................... | 156/244 X |
| 2,932,597 | 4/1960 | St. John et al. ............... | 156/244 X |
| 3,018,212 | 1/1962 | Chinn........................... | 156/195 |
| 3,321,357 | 5/1967 | Kennedy ...................... | 156/244 X |
| 3,399,095 | 8/1968 | Hyland......................... | 156/195 X |
| 3,400,029 | 9/1968 | Mesrobian et al. ............ | 156/244 X |
| 3,452,506 | 7/1969 | Broerman..................... | 156/195 X |
| 3,457,130 | 7/1969 | Morrison...................... | 156/195 X |
| 3,525,656 | 8/1970 | Kennedy, Jr.................. | 156/392 X |

*Primary Examiner*—Leland A. Sebastian
*Assistant Examiner*—Gary G. Solyst
*Attorney*—Ernest F. Marmorek ABSTRACT: A method of enveloping a steel pipe includes the simultaneous winding of the heated pipe with a twin layer of two materials in screw thread fashion. The outer material is a thermoplastic synthetic sheet, and the inner material an adhesive strip.

PATENTED OCT 26 1971

3,616,006

Inventors:
Helmut Landgraf and
Walter Quitmann,
By _____
Their Attorney.

METHOD OF ENVELOPING A STEEL PIPE

METHOD OF ENVELOPING A STEEL PIPE

The invention relates to a method of enveloping a steel pipe with a thermoplastic synthetic material, such as polyethylene. More particularly, the invention relates to a method of such enveloping, wherein the steel of synthetic material is wound in screw thread fashion about the external surface of the pipe while the pipe is heated to a predetermined elevated temperature and is rotated, and the synthetic sheet is connected to the external surface of the pipe by means of a cement.

It is desirable to envelop steel pipes, particularly those which are to be laid into the ground, with a layer of corrosion preventing material made of thermoplastic synthetic material, such as polyvinylchloride or polethylene. Methods are known, for carrying out that enveloping; most of these layers are connected to the external surface of the pipe by cementing. The synthetic material may be applied to the outer surface of the steel pipe by extrusion, for example, using an angular spray nozzle through which the pipe is moved longitudinally ; prior to the application of the synthetic material, the external surface of the pipe has been coated with a cement. In this manner, the tube will be provided with a single layer of a seamless skin or sleeve of synthetic material.

It is furthermore known to wind a sheet in screw thread fashion about a pipe.

In accordance with another known method, the adhesive cement for the synthetic material consists of polyethylene powder which is sintered onto the external surface of the pipe.

These known methods have, however various drawbacks. Where a cement is applied between the synthetic layer and the steel pipe, displacements may occur between the protective synthetic layer and the steel pipe, during mechanical stresses or temperature changes.

Where, on the other hand, a polyethylene powder is used as an adhesive, for improved adhesion, this requires for a proper adhesion either the addition of further ingredients, or the working at higher temperatures, which may lead to a decomposition of the powder and the formation of bubbles.

It is accordingly among the principal objects of the invention to avoid the aforesaid drawbacks, particularly in connection with the enveloping of steel pipes of large diameter.

It is another object of the invention to provide a simple and safe method for enveloping steel pipes, particularly those of large diameter.

Further objects and advantages of the invention will be set forth in part in the following specification and in part will be obvious therefrom without being specifically referred to, the same being realized and attained as pointed out in the claims hereof.

Broadly speaking, the instant invention provides for a method that superposes an elongated sheet of thermoplastic synthetic material above an adhesive strip, and winding both simultaneously in screw thread fashion about the pipe, with the width of the synthetic sheet being a multiple of the width of the adhesive strip, and the width of the adhesive strip being at least as large as the width of pitch of the sheet of thermoplastic material threaded on the external surface of the pipe.

Furthermore, the synthetic sheet as well as the adhesive strip may simultaneously both be produced by extrusion shortly before being wound onto the steel pipe. Lastly, the under face of the synthetic material may be pressed prior to the winding, onto the upper face of the adhesive strip.

The instant invention offers the advantage of enveloping steel pipes of various diameters, including large diameter pipes, in a single operation, and providing for a dependable adhesion between the external surface of the steel pipe and the thermoplastic synthetic sheet layer that is wound thereon in overlapping screw thread fashion.

Figure 2:
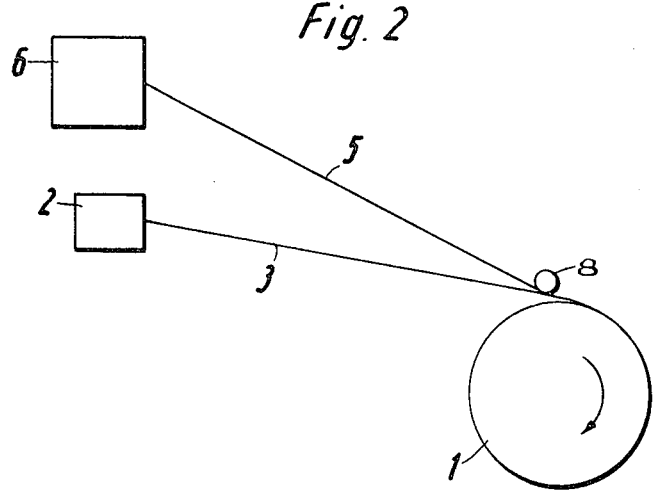

For a fuller understanding of the nature and objects of the invention, reference should be had to the following detailed description, taken in connection with the accompanying drawings, in which:

FIG. 1 is a schematic fragmentary front elevational view of an apparatus for the method in accordance with the invention; and FIG. 2 is a schematic side elevational view of the apparatus of FIG. 1.

In carrying the invention into effect in one of the embodiments which has been selected for illustration in the accompanying drawings and for description in this specification, there is provided a steel pipe 1 that is to be enveloped with a thermoplastic synthetic material. The pipe 1 is being moved in screw thread fashion, namely it is being moved axially as indicated by the arrow in FIG. 1, and is also rotated about its longitudinal axis in accordance with the arrow of FIG. 2.

The adhesive 3 emerges in the form of a strip from a slit 4 of an extrusion head 2. Simultaneously, an elongated sheet of thermoplastic synthetic material 5 emerges from a slit 7 of an extrusion head 6. The extrusion heads 2 and 6 are fed in a well known conventional manner from extrusion devices (not shown).

The sheet 5 is disposed above the adhesive strip 3, and one edge (the right hand edge, FIG. 1) of the adhesive strip 3 and of the sheet material 5 are disposed in substantially the same vertical plane. The slits 4 and 7, accordingly have one end edge (right side, FIG. 1) superposed in the same plane.

The two extrusion heads 2 and 6 may be united into one aggregate, with the two superposed slits 4 and 7 respectively, simultaneously producing the adhesive strip 3 and the elongated sheet of thermoplastic synthetic material 5.

A pressure roll 8 may be provided that presses the underface of the sheet 5 against the upper face of the adhesive strip 3 prior to the winding of these bands onto the pipe 1.

We wish to be understood that we do not desire to be limited to the exact details of construction shown and described, for obvious modifications will occur to a person skilled in the art.

Having thus described the invention, what we claim as new and desire to be secured by Letters Patent, is as follows:

1. In the method of enveloping a steel pipe, heated to a predetermined elevated temperature, with an elongated sheet of thermoplastic synthetic material, the steps comprising extruding and, winding the sheet in screw thread fashion of a certain pitch about the external surface of said pipe while rotating the pipe, resulting in an envelope of overlapping sheet windings having a predetermined width of overlapping, simultaneously therewith extruding and winding an adhesive strip, of high viscosity at said elevated temperature, between said external surface of the pipe and said sheet in screw thread fashion of substantially said certain pitch, with one edge of said adhesive strip disposed below, in substantially the same vertical plane as, an edge of said sheet, the width of said sheet being a multiple of the width of said adhesive strip, and the width of said adhesive strip being at least as large as said width of pitch of the sheet of thermoplastic material.

2. In a method enveloping a steel pipe, heated to a predetermined elevated temperature, with an elongated sheet of thermoplastic synthetic material, the steps comprising, winding the sheet in screw thread fashion of a certain pitch about the external surface of said pipe while rotating the pipe, resulting in an envelope of overlapping sheet windings having a predetermined width of overlapping, simultaneously therewith, winding an adhesive strip, of high viscosity at said elevated temperature, between said external surface of the pipe and said sheet in screw thread fashion of substantially said certain pitch, with one edge of said adhesive strip disposed below, in substantially the same vertical plane as, an edge of said sheet, the width of said sheet being a multiple of the width of said adhesive strip, and the width of said adhesive strip being at least as large as said width of pitch and the step of extruding simultaneously said elongated sheet of synthetic material and said adhesive strip prior to the winding thereof onto said pipe.

3. In a method of enveloping a steel pipe, as claimed in claim 1, the step of pressing the under face of the synthetic sheet that faces said external surface of said pipe onto the upper face of said adhesive strip prior to the winding of said sheet and strip onto the pipe.

* * * * *